US012364351B1

(12) United States Patent
Qu

(10) Patent No.: US 12,364,351 B1
(45) Date of Patent: Jul. 22, 2025

(54) CARBONIZED WOODEN WINE GLASS AND MANUFACTURING METHOD THEREOF

(71) Applicant: Shiji Qu, Liaoning (CN)

(72) Inventor: Shiji Qu, Liaoning (CN)

( * ) Notice: Subject to any disclaimer, the term of this patent is extended or adjusted under 35 U.S.C. 154(b) by 0 days.

(21) Appl. No.: 19/031,312

(22) Filed: Jan. 17, 2025

(51) Int. Cl.
*B27M 3/24* (2006.01)
*A47G 19/22* (2006.01)

(52) U.S. Cl.
CPC ........... *A47G 19/2255* (2013.01); *B27M 3/24* (2013.01)

(58) Field of Classification Search
CPC .................................. B27M 1/06; B27M 3/24
See application file for complete search history.

(56) References Cited

PUBLICATIONS

Jp woodwork, Woodturning a Cherry Wood Wine Glass, May 20, 2019, https://www.youtube.com/watch?v=zxlt_T-tjPc (Year: 2024).*

M. Saban Smith Woodturning, #95 Glass-like Finishing with Lacquer, Sealer and Drying Oil (Woodturning), Jun. 11, 2019, https://www.youtube.com/watch?app=desktop&v=90DmD3YUgQE&t=222s (Year: 2019).*

Industrial comfort, DIY: Turn and Make a Charred Oak Whiskey Tasking Cup with Joel From Whiskey Rocks Podcast! Part 3, Jun. 2, 2024, https://www.youtube.com/watch?v=JOQILbtRZ_Q (Year: 2024).*

Made By Millennial, Woodturning—Bourbon Barrel Glass, May 17, 2019, https://www.youtube.com/watch?v=4Kjf8v42MxU (Year: 2019).*

* cited by examiner

*Primary Examiner* — Matthew Katcoff

(57) ABSTRACT

A carbonized wooden wine glass includes a wooden main body and a carbonized region. The wooden main body is cuplike, and the carbonized region is formed after the wooden main body is carbonized. A manufacturing method of a carbonized wooden wine glass, including: selecting a wood; cutting the wood into a wood block; drying the cut wood block in the air; molding the dried wood block to make the wood block into a wooden wine glass; preliminarily grinding and repairing the molded wooden wine glass; performing primary lacquering on the preliminarily ground and repaired wooden wine glass; carbonizing the wooden wine glass subjected to the primary lacquering; performing secondary grinding and secondary lacquering on the carbonized wooden wine glass; and performing sealing and shade drying on the wooden wine glass subjected to the secondary grinding and the secondary lacquering.

17 Claims, 18 Drawing Sheets

CARBONIZED WOODEN WINE GLASS AND MANUFACTURING METHOD THEREOF

TECHNICAL FIELD

The present invention relates to the technical field of cups, and in particular, to a carbonized wooden wine glass and a manufacturing method thereof.

BACKGROUND OF THE INVENTION

There are various materials commonly used for preparing wine glasses on the market. The wine glasses are usually made of glass, ceramic, metal, plastic, and wood. Although the wine glasses made of the glass have high transparency, they are fragile. The ceramic wine glasses have good heat insulation but are thick and opaque. The metal wine glasses are durable but may affect the taste of wine. The plastic wine glasses are lightweight but have poor texture and may have an odor. Although the traditional wooden wine glasses have unique natural beauty and cultural charm, they are prone to moisture and bacterial growth.

With the improvement of the quality of life and the diversification of pursuit of drinking experience, a new type of wine glass that not only has unique charm, but also overcomes the shortcomings of the traditional wooden wine glasses.

Therefore, the present invention provides a carbonized wooden wine glass that can effectively solve the above-mentioned problems.

SUMMARY OF THE INVENTION

To overcome the shortcomings in the prior art, the present invention provides a carbonized wooden wine glass which has a simple structure and can further solve the problems that the traditional wooden wine glass is prone to moisture and bacterial growth and also ensure the user experience, thus further enhancing a visual exhibition effect of the wooden wine glass.

The technical solution adopted by the present invention to solve the technical problem is as follows.

A carbonized wooden wine glass includes a wooden main body and a carbonized region. The wooden main body is cuplike, and the carbonized region is formed after the wooden main body is carbonized.

As an improvement of the present invention, the wooden main body includes a bowl portion, a stem portion, and a base portion; the bowl portion includes an open end and a closed end; the stem portion includes a bottom end and a top end; the base portion includes a mounting end and a supporting end; the closed end is fixedly connected to the top end; the mounting end is fixedly connected to the bottom end; and the carbonized region is arranged on an inner side of the bowl portion.

The present invention also provides a manufacturing method of a carbonized wooden wine glass, including:

S10: selecting a wood;

S20: cutting the wood into a wood block;

S30: drying the cut wood block in the air;

S40: molding the dried wood block to make the wood block into a wooden wine glass;

S50: preliminarily grinding and repairing the molded wooden wine glass;

S60: performing primary lacquering on the preliminarily ground and repaired wooden wine glass;

S70: carbonizing the wooden wine glass subjected to the primary lacquering;

S80: performing secondary grinding and secondary lacquering on the carbonized wooden wine glass; and

S90: performing sealing and shade drying on the wooden wine glass subjected to the secondary grinding and the secondary lacquering.

As an improvement of the present invention, step S20 includes:

S21: selecting a tool;

S22: determining a cutting plan;

S23: performing a cutting operation; and

S24: performing cleaning and inspection.

As an improvement of the present invention, step S23 includes:

S23*a*: fixing the wood; and

S23*b*: performing cutting.

As an improvement of the present invention, step S24 includes:

S24*a*: cleaning wood dust; and

S24*b*: inspecting the cut block.

As an improvement of the present invention, step S30 includes:

S31: selecting an air drying site;

S32: repairing an air drying tool and an auxiliary material;

S33: placing the wood block;

S34: performing monitoring and adjustment during air drying; and

S35: determining whether the air drying is completed.

As an improvement of the present invention, step S34 includes:

S34*a*: regularly inspecting a state of the wood block; and

S34*b*: controlling an air drying environment.

As an improvement of the present invention, step S40 includes:

S41: preparing a tool and a material;

S42: determining a molding plan;

S43: performing a molding operation; and

S44: performing quality check and adjustment.

As an improvement of the present invention, step S41 includes:

S41*a*: selecting a molding tool; and

S41*b*: preparing an auxiliary material.

As an improvement of the present invention, step S42 includes:

S42*a*: analyzing a product; and

S42*b*: planning a process.

As an improvement of the present invention, step S43 includes:

S43*a*: fixing the wood block;

S43*b*: performing cylindrical turning; and

S43*c*: processing an inner hole.

As an improvement of the present invention, step S50 includes:

S51: preparing a tool and a material;

S52: performing a grinding operation;

S53: performing repair treatment; and

S54: performing inspection and cleaning.

As an improvement of the present invention, step S52 includes:

S52*a*: performing large-area rough grinding; and

As an improvement of the present invention, step S53 includes:

S53*a*: repairing cracks; and

S53*b*: repairing pits and worm-eaten holes.

As an improvement of the present invention, step S60 includes:

S61: preparing a lacquer and a tool;

S62: preparing a lacquering environment;

S63: performing pre-lacquering treatment; and

S64: performing a lacquering operation.

As an improvement of the present invention, step S70 includes:

S71: preparing carbonization equipment and a carbonization site;

S72: performing a carbonization operation; and

S73: performing cooling.

As an improvement of the present invention, step S80 includes:

S81: preparing a lacquer and a tool;

S82: performing inspection before secondary grinding;

S83: performing a secondary grinding operation;

S84: making a preparation before secondary lacquering; and

S85: performing a secondary lacquering operation.

As an improvement of the present invention, step S90 includes:

S91: preparing a shade drying site and a container;

S92: making a preparation before the wooden wine glass is put into a box;

S93: performing wooden wine glass placement and sealing operation

S94: monitoring the shade drying process; and

S95: determining whether the shade drying is completed, and performing subsequent treatment.

The present invention also provides a carbonized wooden wine glass, which is manufactured by the manufacturing method of the carbonized wooden wine glass described above.

Beneficial effects of the present invention are as follows. By the arrangement of the above structure, during use, the moisture resistance and corrosion resistance of wood are greatly improved through the carbonization, which effectively solves the problem that the traditional wooden wine glass is prone to moisture and prolongs the service life of a wine glass. Meanwhile, the carbonization process changes an internal structure of the wood, so that the wine glass has an antibacterial property, thereby reducing the possibility of bacterial growth and making the wine glass more hygienic and beneficial to the health of a user. Moreover, the unique carbonized wood keeps the natural texturing and color of the wood, and presents a unique texture after the carbonization treatment, so that the wine glass is beautiful and practical. Whether at family gatherings or high-end social occasions, this wine glass can show its unique taste.

BRIEF DESCRIPTION OF DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE INVENTION

Figure 1:
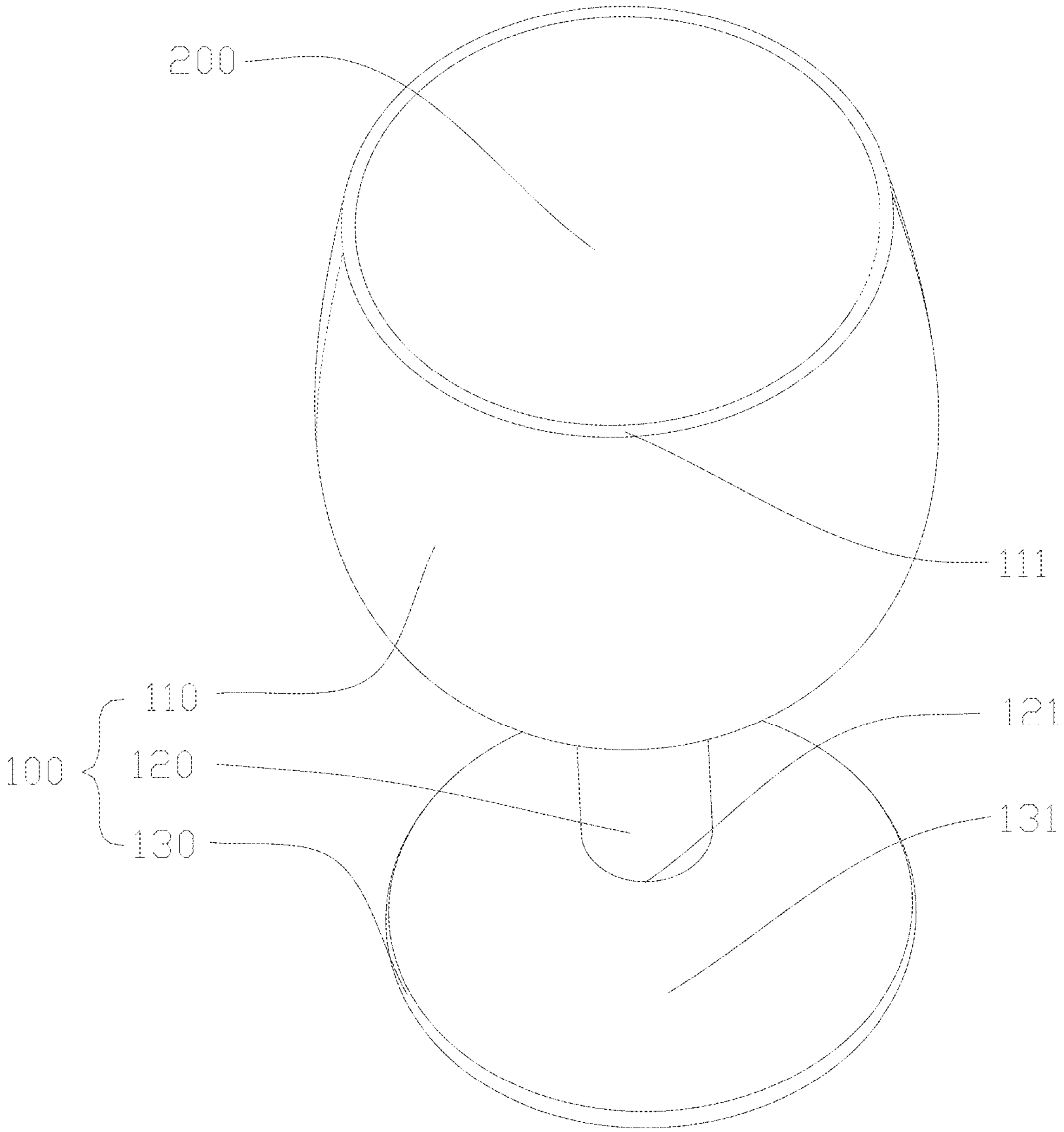
FIG. 1 is a schematic diagram of an entire structure of a carbonized wooden wine glass according to Embodiment 1 of the present invention, viewed from a first angle.

To make the aforementioned objectives, features, and advantages of the present disclosure more comprehensible, specific implementations of the present disclosure are described in detail below in conjunction with the accompanying drawings. In the following description, numerous specific details are set forth to provide a thorough understanding of the present disclosure. The present disclosure may, however, be embodied in many forms different from that described here. A person skilled in the art can make similar improvements without departing from the connotation of the present disclosure. Therefore, the present disclosure is not limited by the specific embodiments disclosed below.

In the description of the present disclosure, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure.

In addition, the terms "first" and "second" are used for descriptive purposes only, while not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

In addition, the terms "install", "arrange", "provide", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For ordinary technical personnel in this field, the specific meanings of the above terms in present disclosure can be understood based on specific circumstances.

In the present disclosure, unless specific regulation and limitation otherwise, the first feature "onto" or "under" the second feature may include the direct contact of the first feature and the second feature, or may include the contact of the first feature and the second feature through other features between them instead of direct contact. Moreover, the first feature "onto", "above" and "on" the second feature includes that the first feature is right above and obliquely above the second feature, or merely indicates that the horizontal height of the first feature is higher than the second feature. The first feature "under", "below" and "down" the second feature includes that the first feature is right above and obliquely above the second feature, or merely indicates that the horizontal height of the first feature is less than the second feature.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Figure 2:
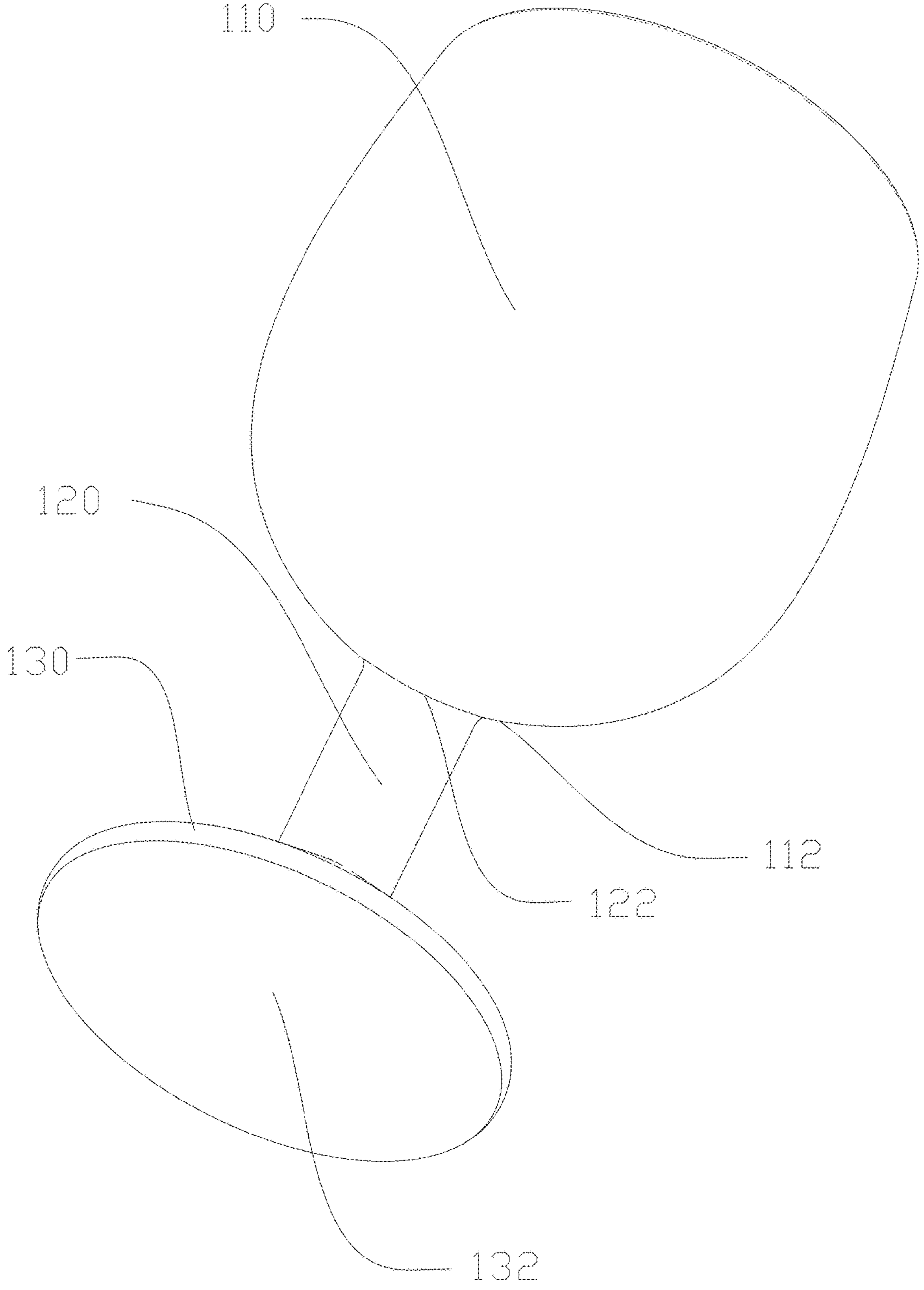
FIG. 2 is a schematic diagram of an entire structure of a carbonized wooden wine glass according to Embodiment 1 of the present invention, viewed from a second angle.
Figure 3:
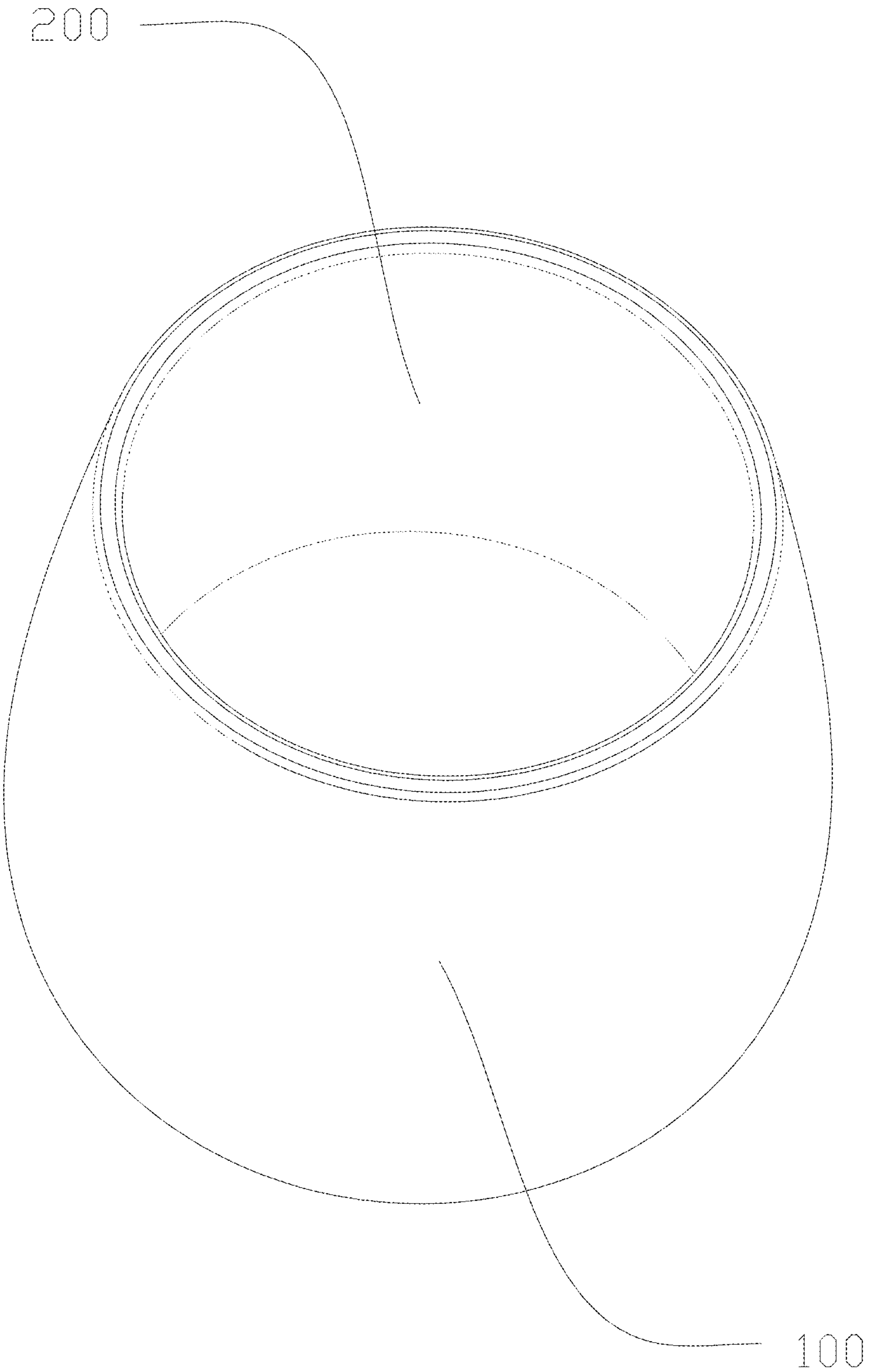
FIG. 3 is a schematic diagram of an entire structure of a carbonized wooden wine glass according to Embodiment 2 of the present invention, viewed from a first angle.
Figure 4:
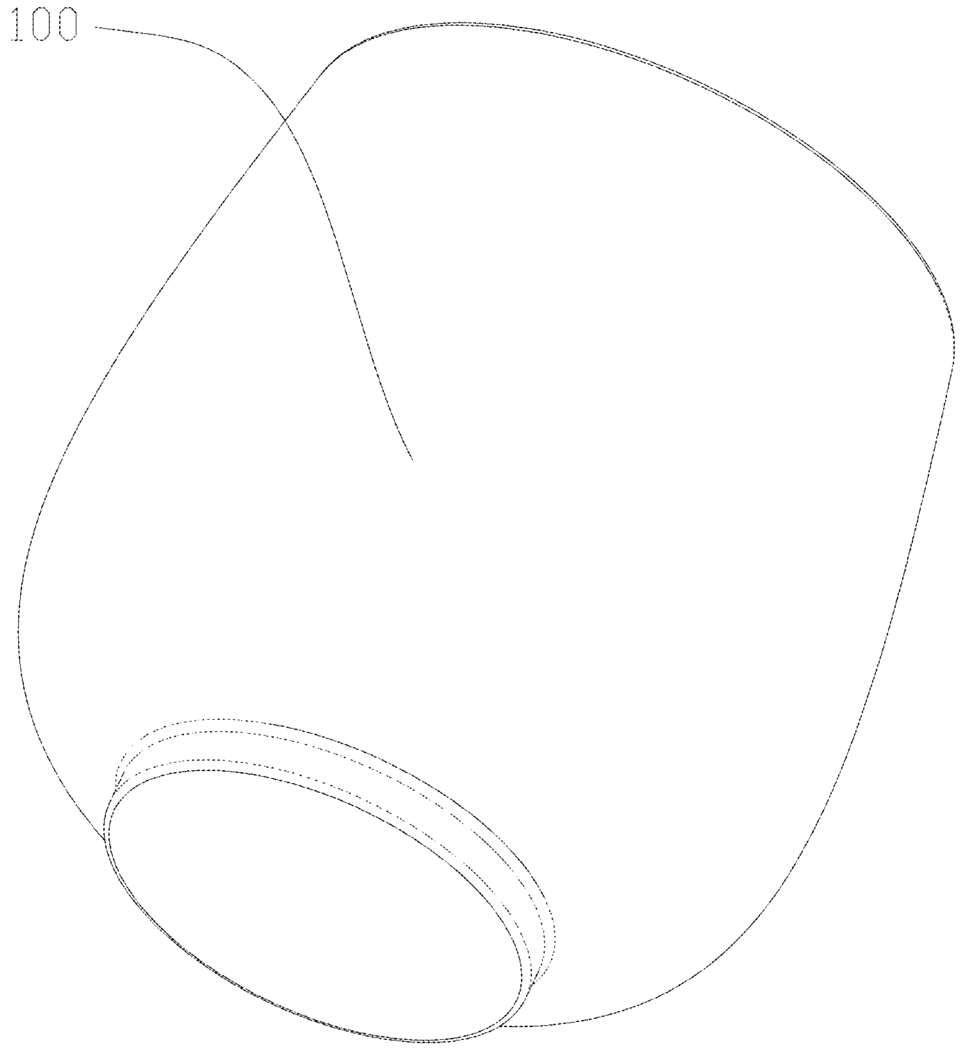
FIG. 4 is a schematic diagram of an entire structure of a carbonized wooden wine glass according to Embodiment 2 of the present invention, viewed from a second angle.
Figure 5:
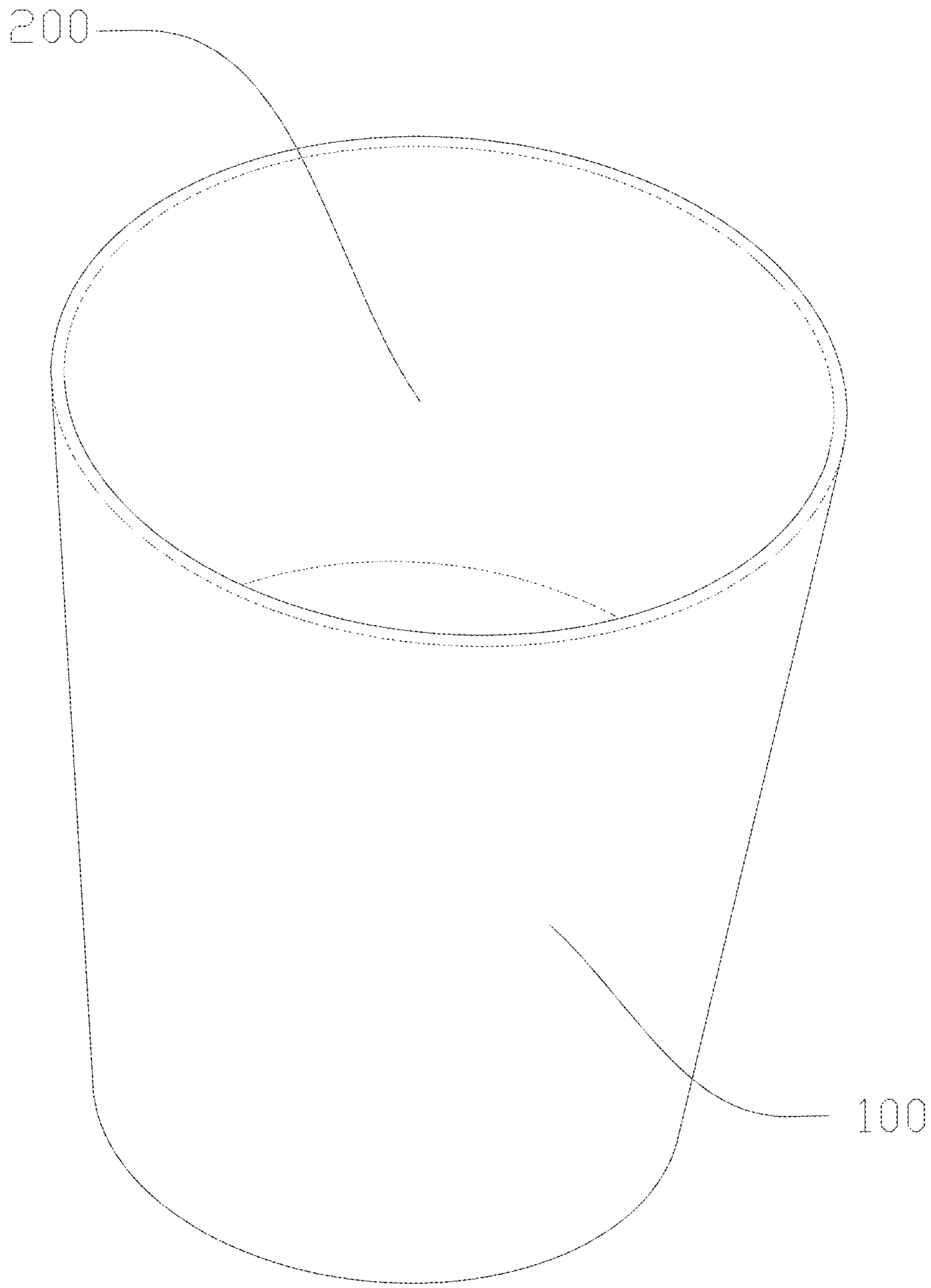
FIG. 5 is a schematic diagram of an entire structure of a carbonized wooden wine glass according to Embodiment 3 of the present invention, viewed from a first angle.
Figure 6:
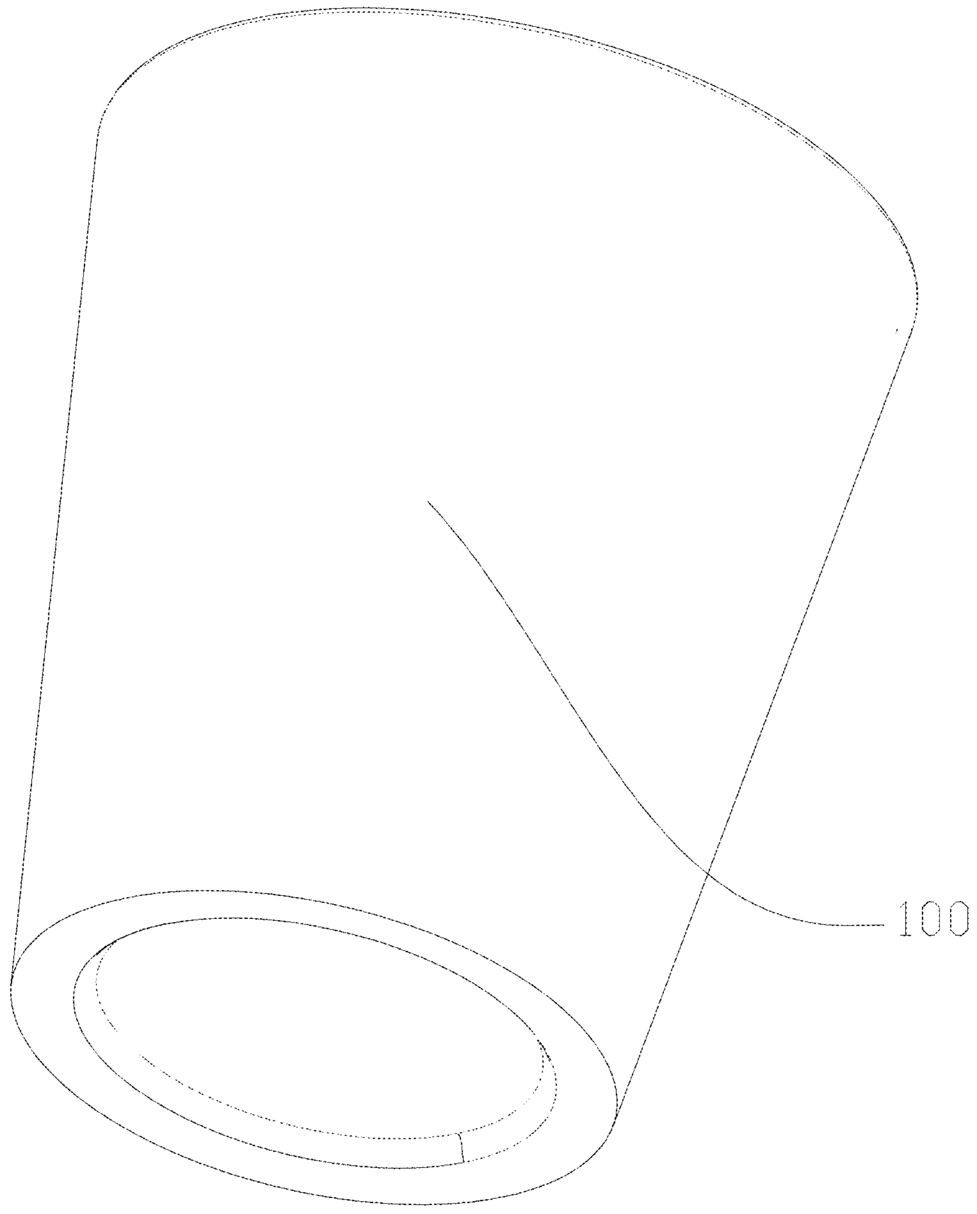
FIG. 6 is a schematic diagram of an entire structure of a carbonized wooden wine glass according to Embodiment 3 of the present invention, viewed from a second angle.
Figure 7:
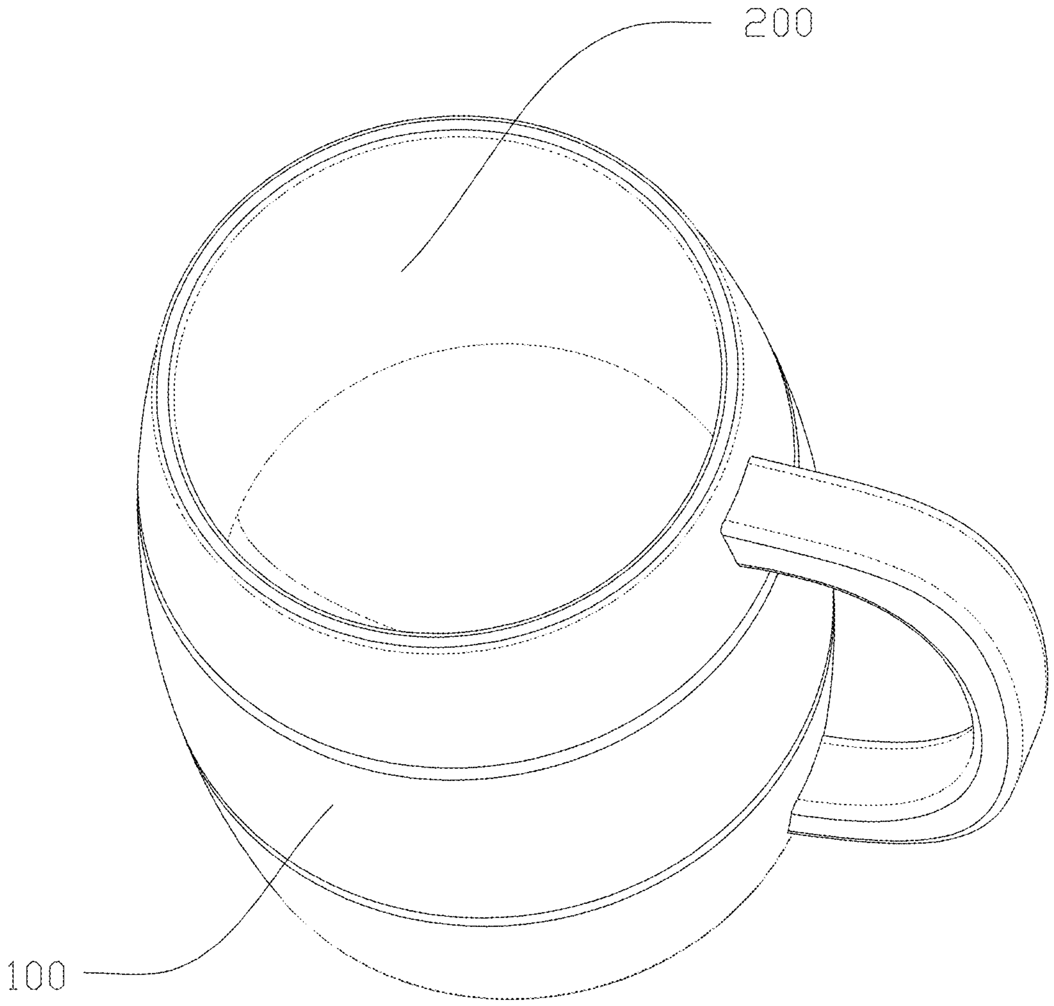
FIG. 7 is a schematic diagram of an entire structure of a carbonized wooden wine glass according to Embodiment 4 of the present invention, viewed from a first angle.
Figure 8:
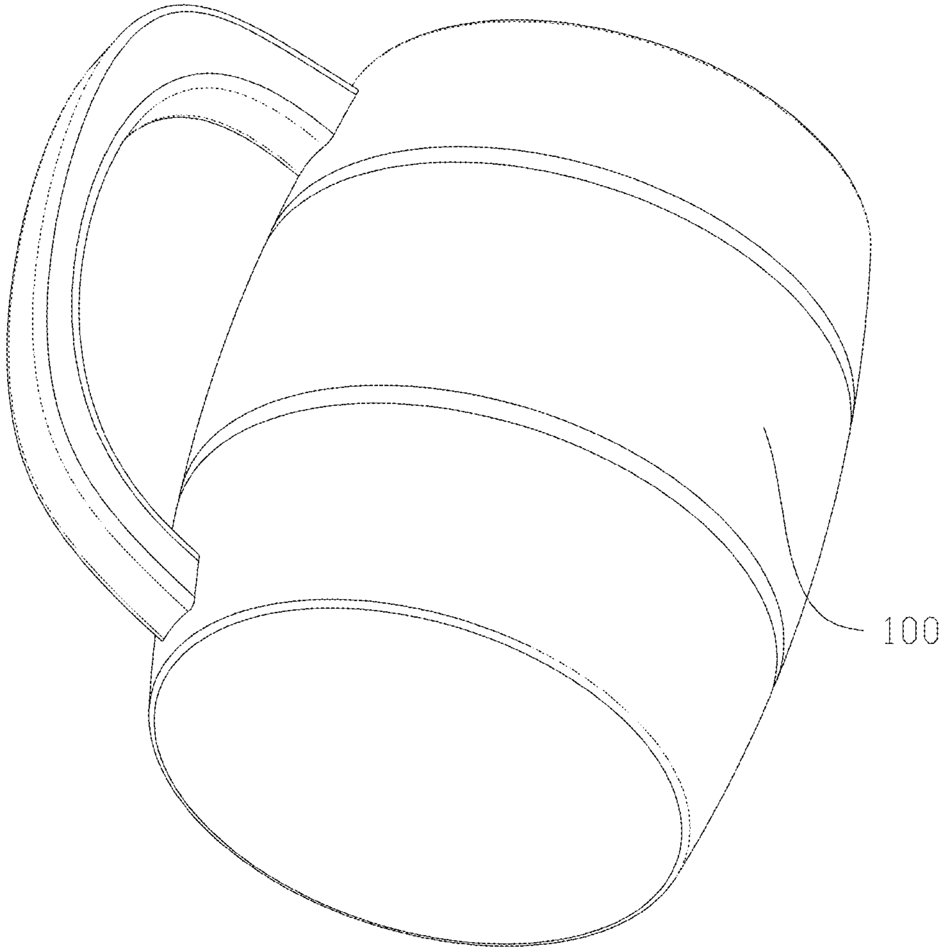
FIG. 8 is a schematic diagram of an entire structure of a carbonized wooden wine glass according to Embodiment 4 of the present invention, viewed from a second angle.
Figure 9:
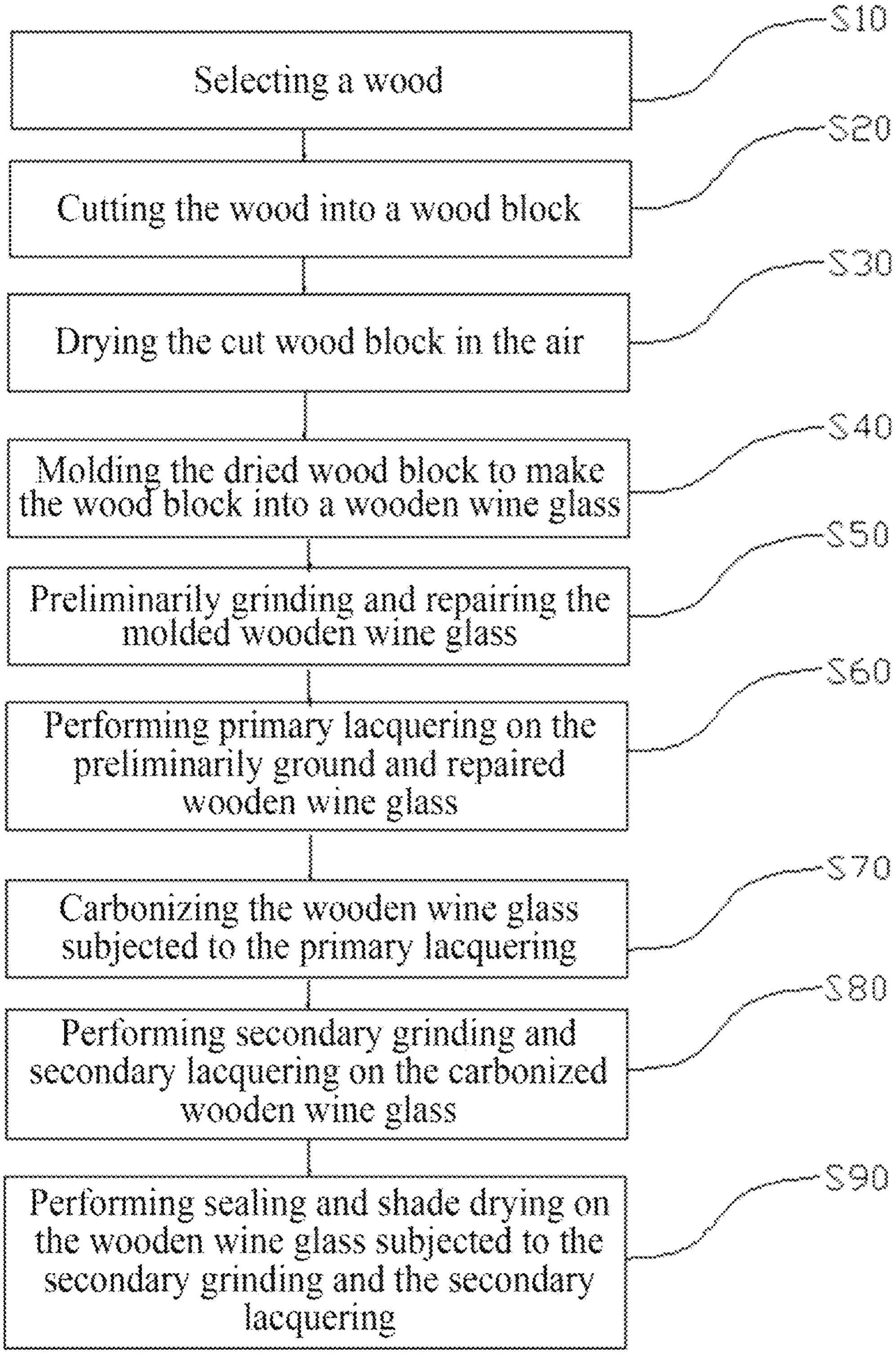
FIG. 9 is a flowchart of overall steps of a method according to the present invention.
Figure 10:
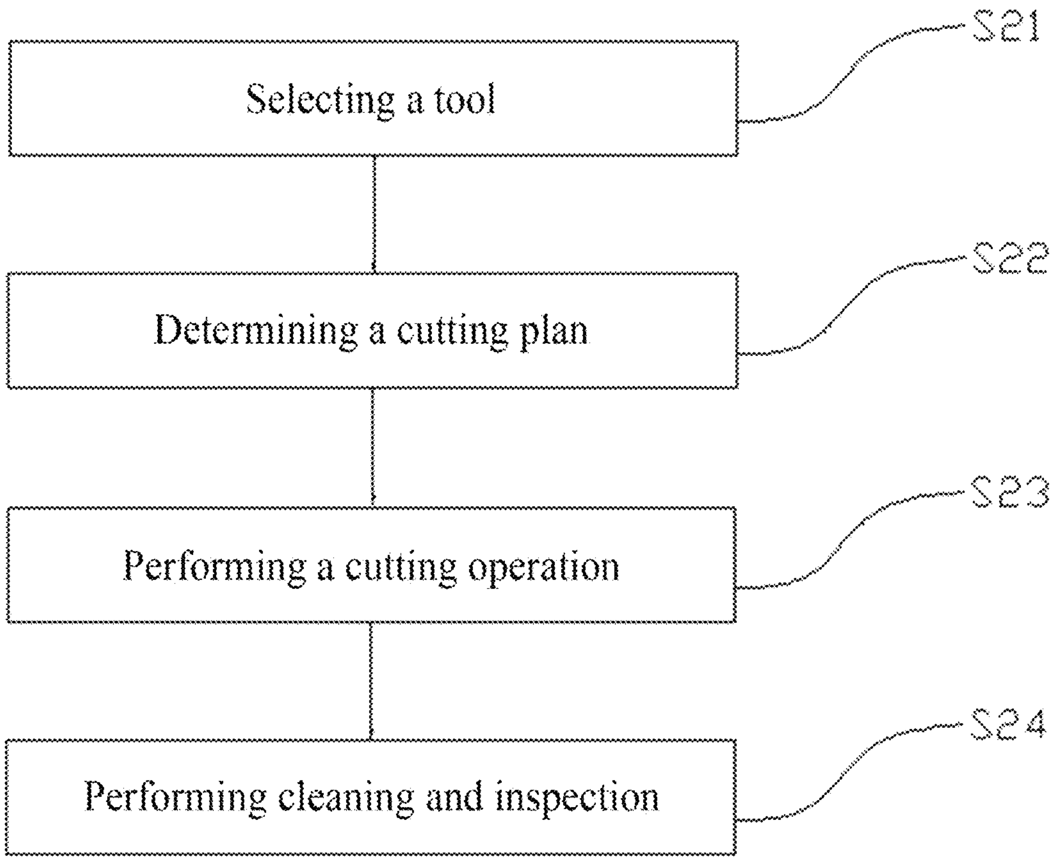
FIG. 10 is a detailed flowchart of step S20 of the method according to the present invention.
Figure 11:
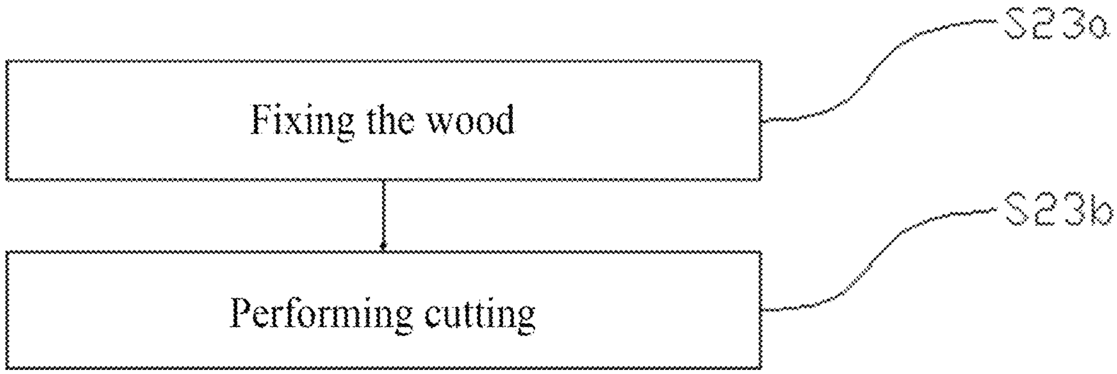
FIG. 11 is a detailed flowchart of step S23 of the method according to the present invention.
Figure 12:
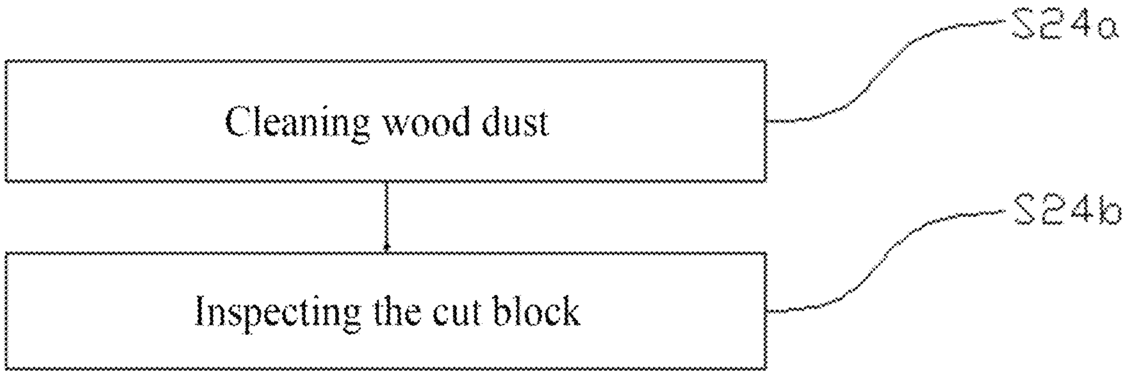
FIG. 12 is a detailed flowchart of step S24 of the method according to the present invention.
Figure 13:
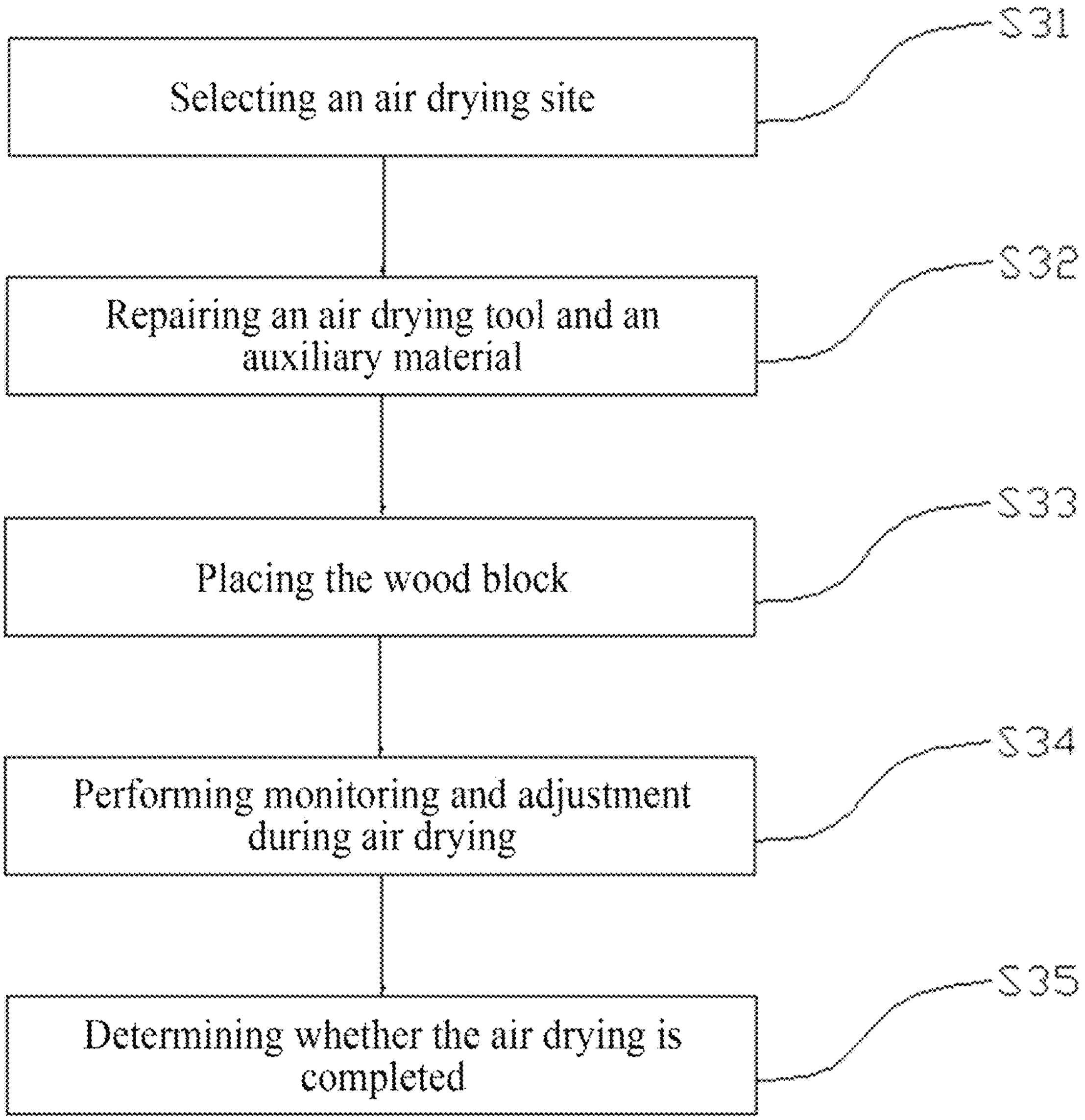
FIG. 13 is a detailed flowchart of step S30 of the method according to the present invention.
Figure 14:
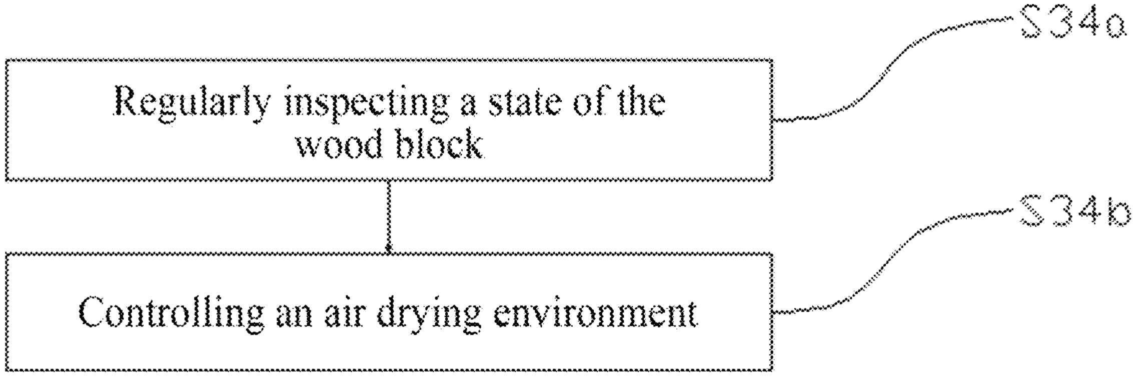
FIG. 14 is a detailed flowchart of step S34 of the method according to the present invention.
Figure 15:
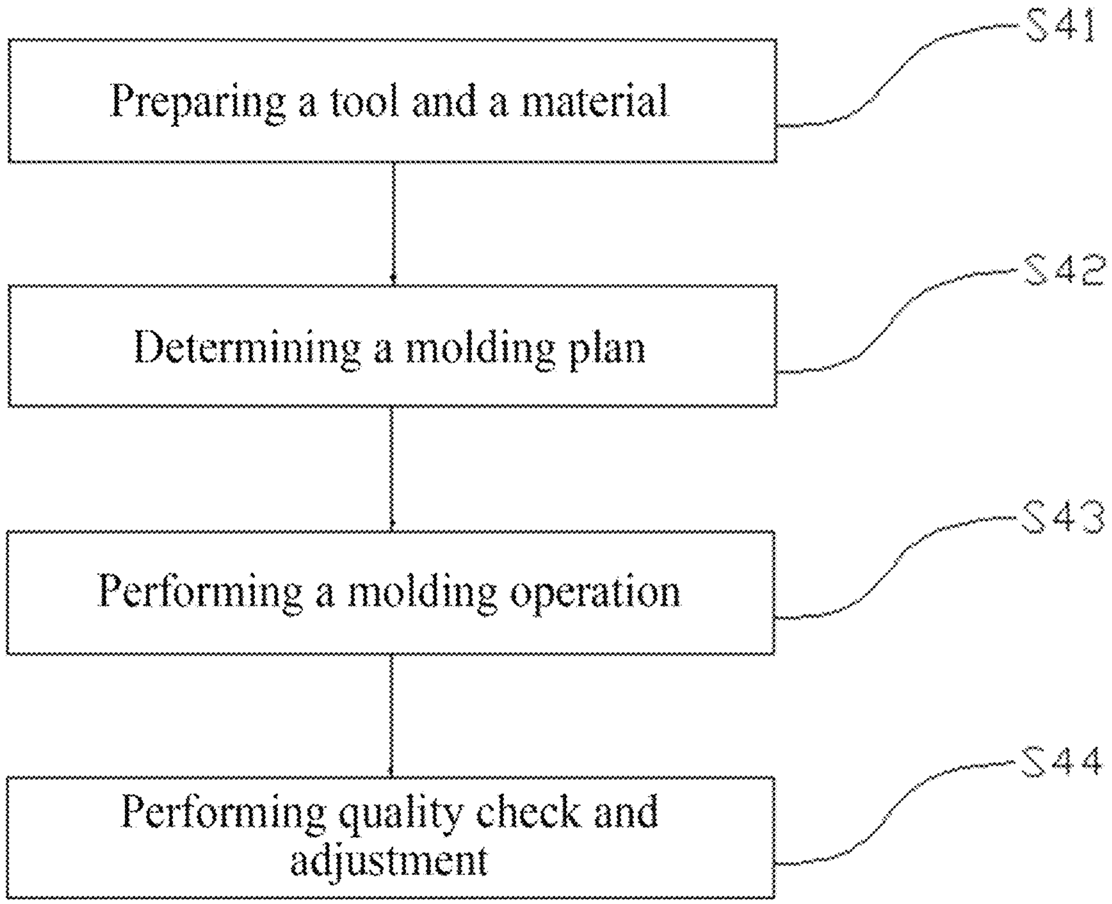
FIG. 15 is a detailed flowchart of step S40 of the method according to the present invention.
Figure 16:
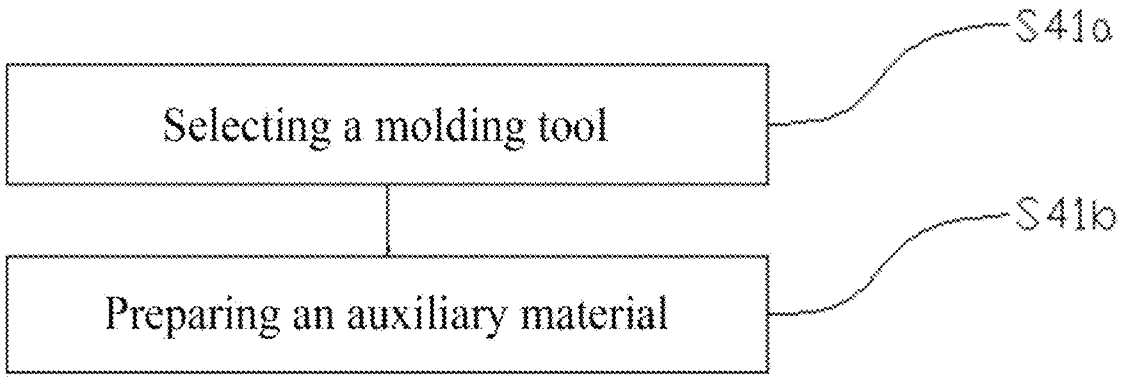
FIG. 16 is a detailed flowchart of step S41 of the method according to the present invention.
Figure 17:
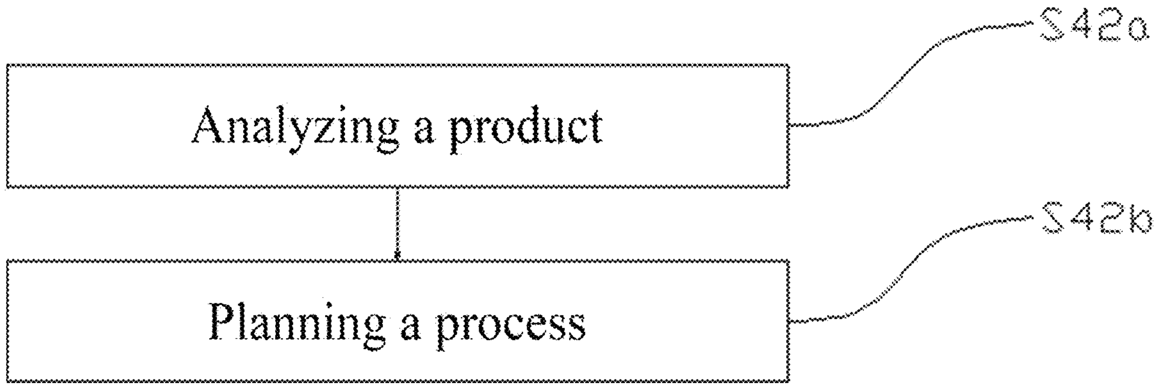
FIG. 17 is a detailed flowchart of step S42 of the method according to the present invention.
Figure 18:
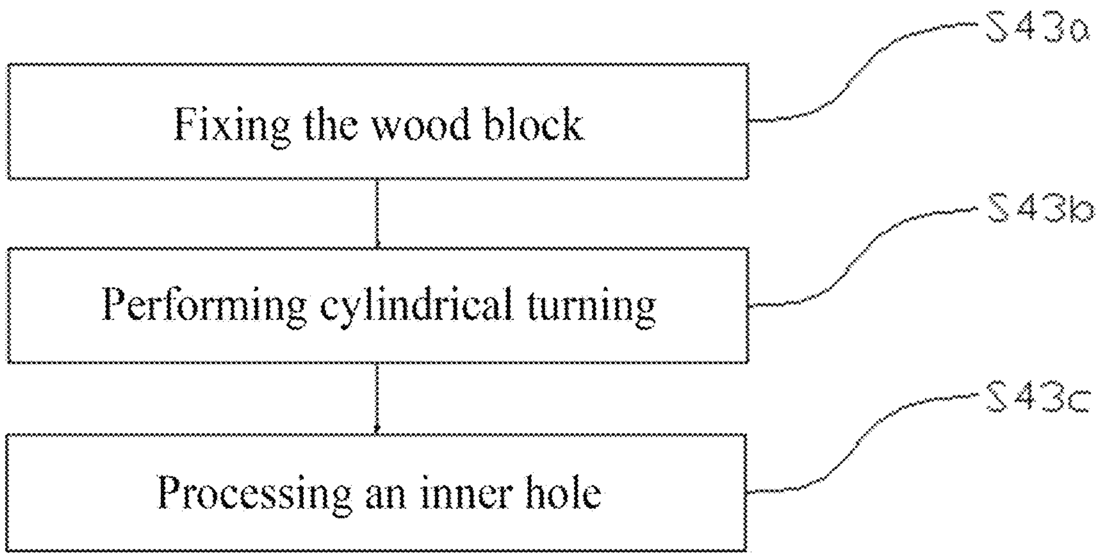
FIG. 18 is a detailed flowchart of step S43 of the method according to the present invention.
Figure 19:
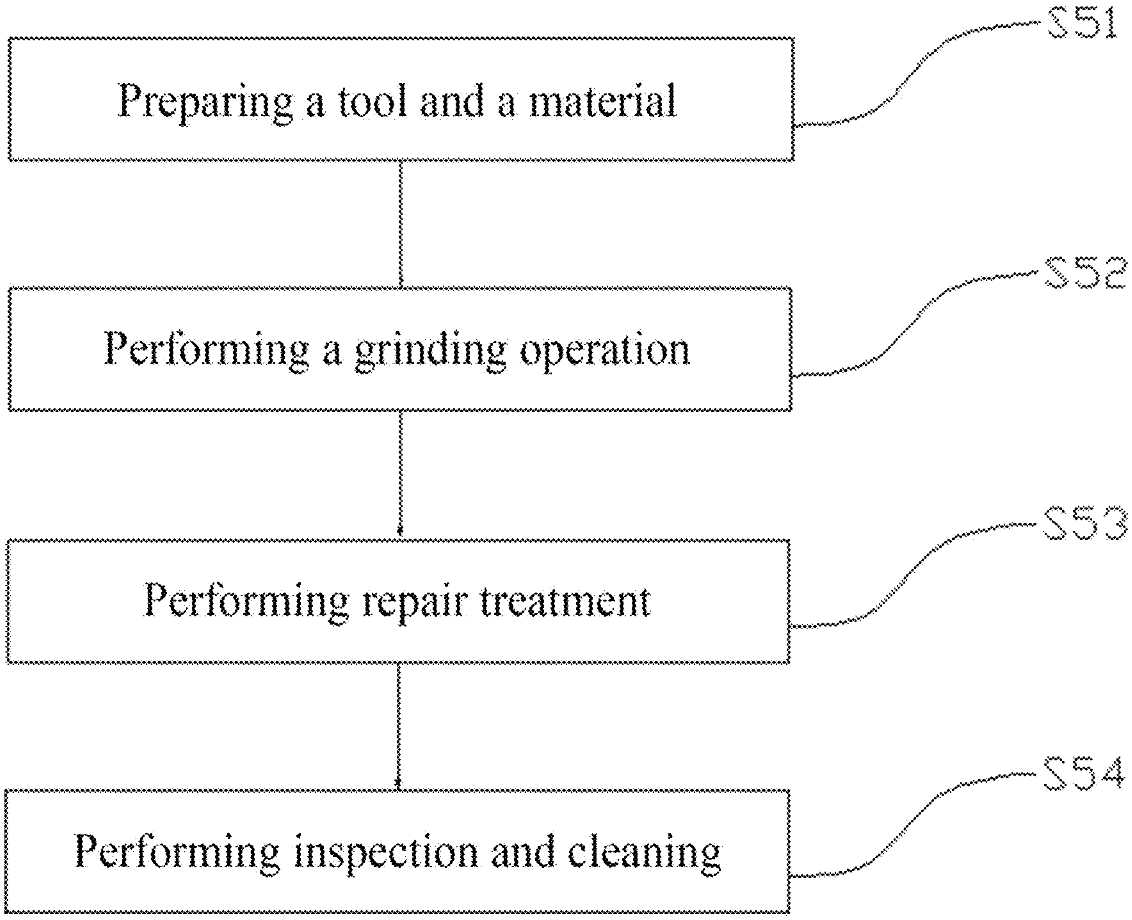
FIG. 19 is a detailed flowchart of step S50 of the method according to the present invention.
Figure 20:
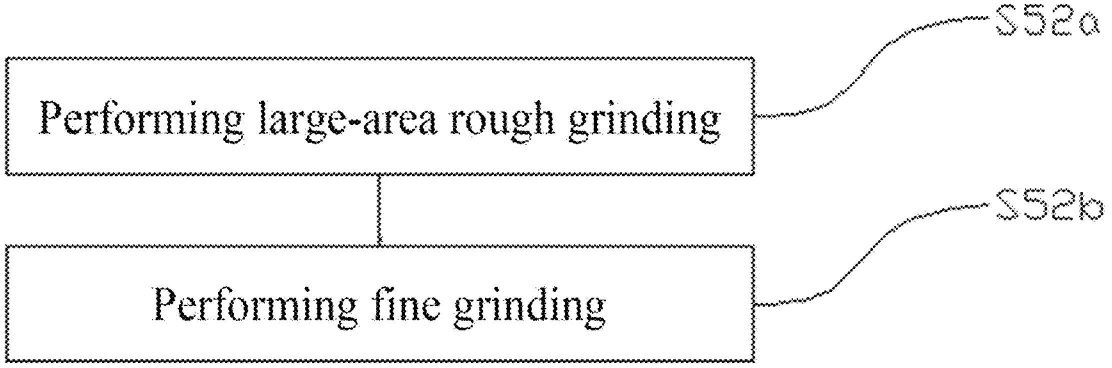
FIG. 20 is a detailed flowchart of step S52 of the method according to the present invention.
Figure 21:
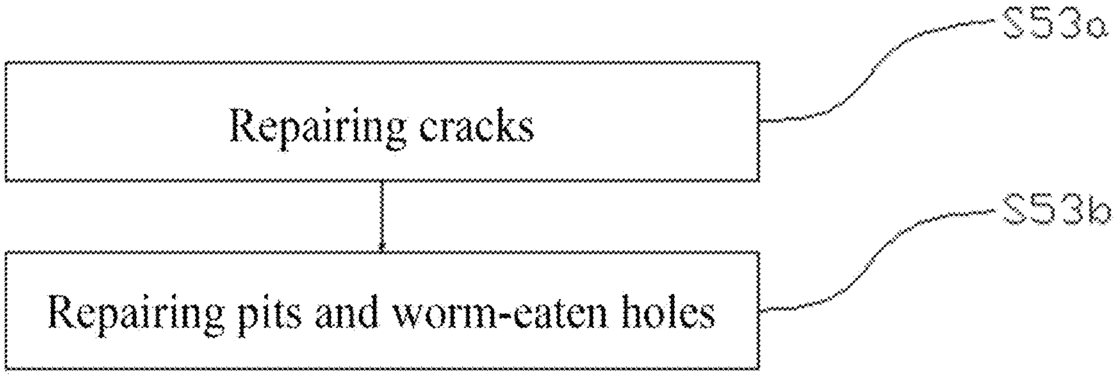
FIG. 21 is a detailed flowchart of step S53 of the method according to the present invention.
Figure 22:
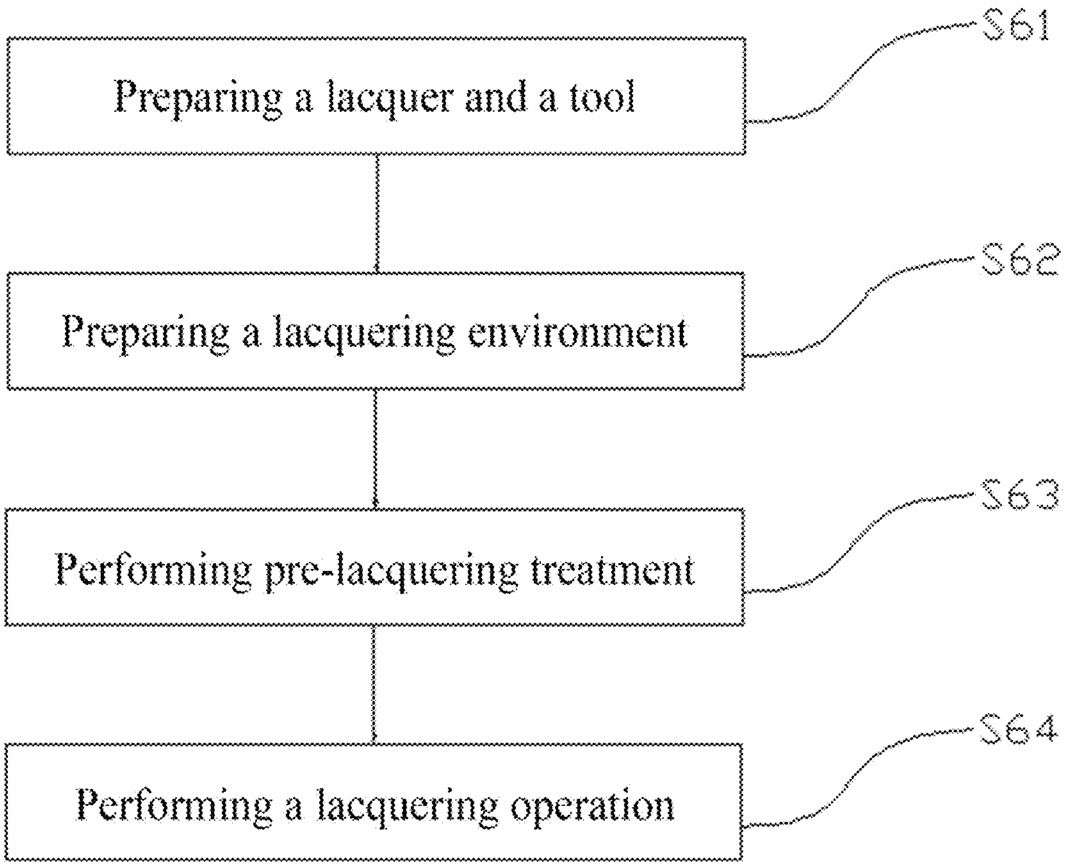
FIG. 22 is a detailed flowchart of step 60 of the method according to the present invention.
Figure 23:
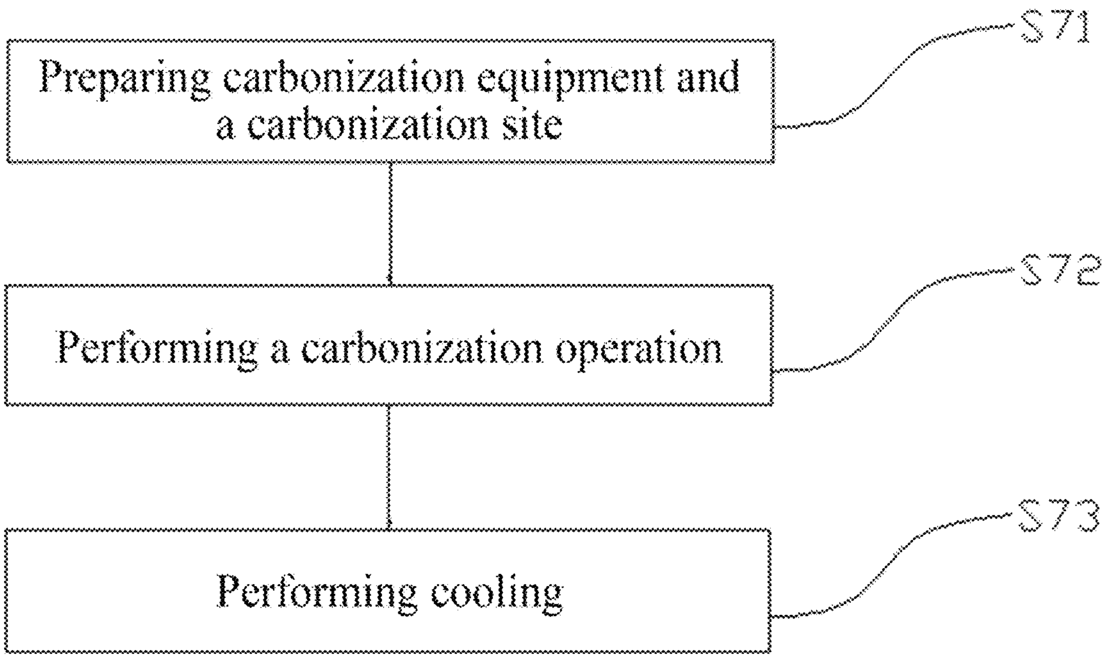
FIG. 23 is a detailed flowchart of step S70 of the method according to the present invention.
Figure 24:
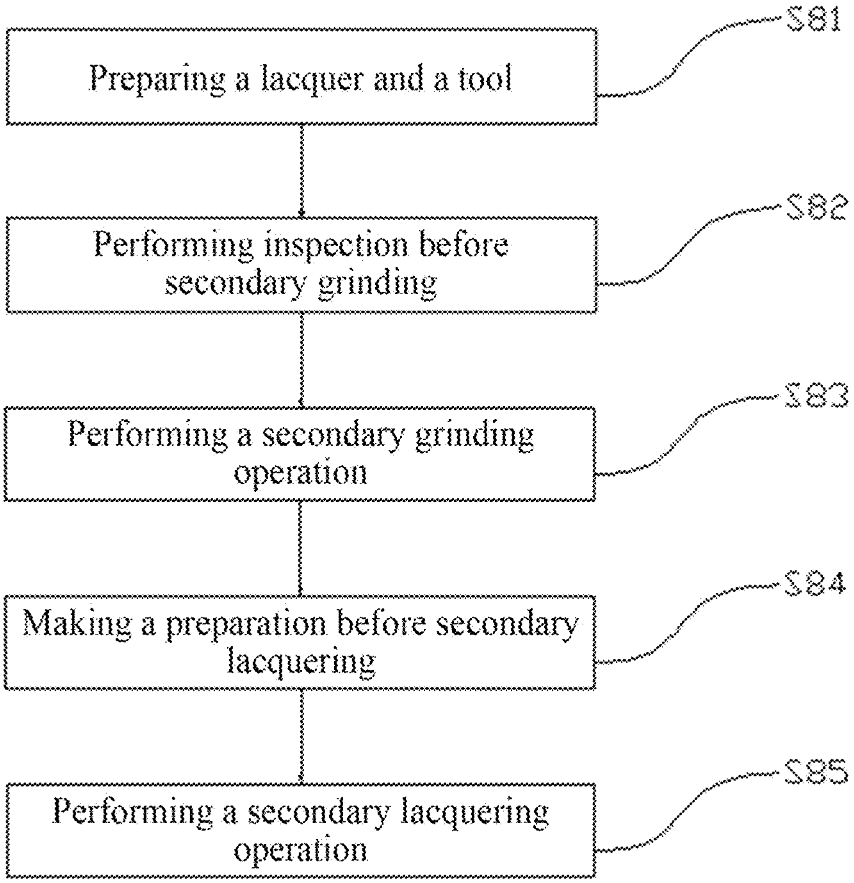
FIG. 24 is a detailed flowchart of step S80 of the method according to the present invention.
Figure 25:
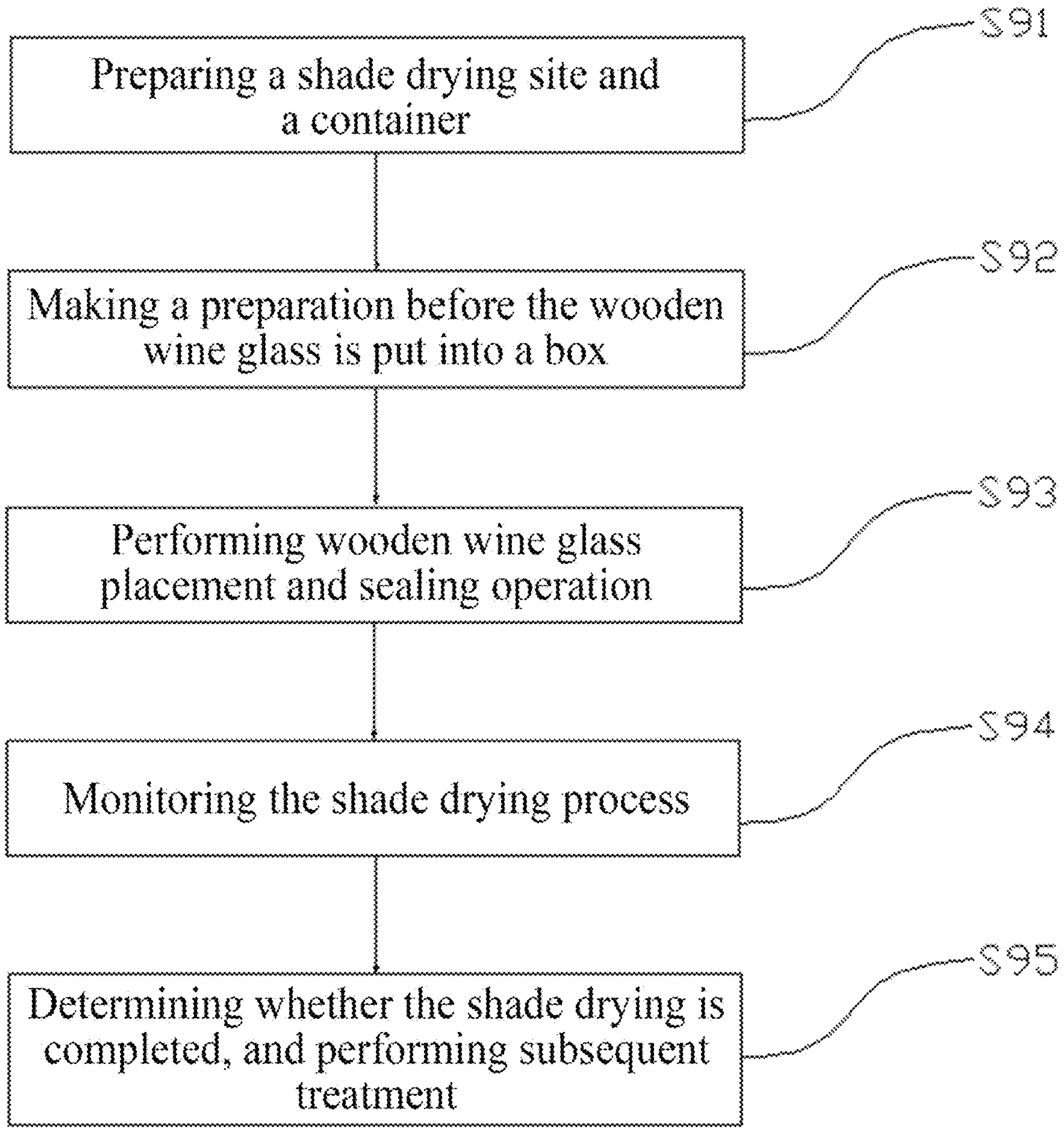
FIG. 25 is a detailed flowchart of step 90 of the method according to the present invention.

Referring to FIG. 1 to FIG. 25, the present invention discloses a carbonized wooden wine glass, including: a wooden main body 100 and a carbonized region 200. The wooden main body 100 is cuplike, and the carbonized region 200 is formed after the wooden main body is carbonized.

By the arrangement of the above structure, during use, the moisture resistance and corrosion resistance of wood are greatly improved through the carbonization, which effectively solves the problem that the traditional wooden wine glass is prone to moisture and prolongs the service life of a wine glass. Meanwhile, the carbonization process changes an internal structure of the wood, so that the wine glass has an antibacterial property, thereby reducing the possibility of bacterial growth and making the wine glass more hygienic and beneficial to the health of a user. Moreover, the unique carbonized wood keeps the natural texturing and color of the wood, and presents a unique texture after the carbonization treatment, so that the wine glass is beautiful and practical. Whether at family gatherings or high-end social occasions, this wine glass can show its unique taste. The combination of the wooden main body 100 and the carbonized region 200 cleverly combines the original characteristic of the wood with a carbonization advantage. The wooden main body 100 is designed in a cup shape that conforms to the ergonomics and a drinking habit, so that it is easily held and used for drinking. The wooden main body 100 can use various materials, and the texturing and densities of different woods can affect the overall texture and appearance of the wine glass. The carbonized region 200 can be arranged on a surface layer of the wooden main body 100, usually on an inner side that is in contact with liquor, or at any other part of the wooden main body 100.

In this embodiment, the wooden main body 100 includes a bowl portion 110, a stem portion 120, and a base portion 130; the bowl portion 110 includes an open end 111 and a closed end 112; the stem portion 120 includes a bottom end 121 and a top end 122; the base portion 130 includes a mounting end 131 and a supporting end 132; the closed end 112 is fixedly connected to the top end 122; the mounting end 131 is fixedly connected to the bottom end 121; and the carbonized region 200 is arranged on an inner side of the bowl portion 110. By the arrangement of the above structure, during use, the bowl portion 110 serves as a main portion for holding the liquor; the open end 111 facilitates pouring of the liquor and drinking; and the closed end 112 is fixedly connected to the top end 122 of the stem portion 120, which ensures the overall stability and continuity of the wine glass. The shape and size of the bowl portion 110 can be designed according to the characteristics of different liquor products. For example, for wine, the bowl portion 110 can promote contact between the wine and the air, to accelerate the release of aroma. The stem portion 120 plays a role of connecting the bowl portion 110 to the base portion 130, and its length and thickness design can affect the overall balance and grip feel of the wine glass. The bottom end 121 is fixedly connected to the mounting end 131 of the base portion 130, which ensures the stability of placement of the wine glass. Meanwhile, when a user holds the wine glass, the stem portion can prevent the temperature of the hand from being directly transferred to the liquor, which can affect the taste of the liquor. The supporting end 132 of the base portion 130 provides a stable supporting surface for the wine glass, to prevent the wine glass from tipping over. The mounting end 131 is fixedly connected to the bottom end 121, so that the structure of the entire wooden main body 100 is more stable. The inner side of the bowl portion 110 is a site that is most easily in contact with the liquor and moisture. The carbonized region 200 is arranged on the inner side of the bowl portion 110, which can effectively use the moisture resistance, corrosion resistance, and antibacterial property of the carbonized wood, to prevent deformation of the wood caused by the moisture due to long-term contact with the liquor, and inhibit bacterial growth. This ensures the hygiene of the wine glass and is beneficial for the health of a user.

The present invention further discloses a manufacturing method of a carbonized wooden wine glass, including:

S10: selecting a wood;

S20: cutting the wood into a wood block;

S30: drying the cut wood block in the air;

S40: molding the dried wood block to make the wood block into a wooden wine glass;

S50: preliminarily grinding and repairing the molded wooden wine glass;

S60: performing primary lacquering on the preliminarily ground and repaired wooden wine glass;

S70: carbonizing the wooden wine glass subjected to the primary lacquering;

S80: performing secondary grinding and secondary lacquering on the carbonized wooden wine glass; and

S90: performing sealing and shade drying on the wooden wine glass subjected to the secondary grinding and the secondary lacquering.

Through the above steps, during execution, step S10 is the foundation of the entire manufacturing process, and the type and quality of the wood directly decide the quality of the final wooden wine glass. Different types of wood have different texturing, hardness, odors, and other characteristics, so that the wood needs to be selected according to a design requirement and an expected effect. In step S20, the raw wood is cut into a block with an appropriate size for subsequent processing. This step requires precise size control to ensure that the wood block can be efficiently transformed into a shape of the desired wooden wine glass during subsequent treatment, and to reduce a waste of materials. In step S30, excess moisture is removed from the wood to prevent deformation, cracking, and other issues that may occur during subsequent processing due to a high moisture content. This step requires natural air drying to determine whether the wood is suitable for molding according to an actual humidity. If the wood has a high humidity, burrs easily occur. If the wood has a low humidity, the wood easily cracks. According to an actual production experience, the wood generally needs to be dried in the natural for about three months, and this time may change according to different types of wood selected. In step S40, a rotary cutting process or another process is used to make the wood block into a shape of a wooden wine glass, which has a high requirement for the process. It is necessary to ensure the dimensional accuracy of the wooden wine glass, a uniform thickness of a wall of the wine glass, and an overall shape meeting a design expectation, which directly affects the practicality and aesthetics of the wooden wine glass. In step S50, a surface of the wooden wine glass is preliminarily smoothed and flattened through grinding, and the wine glass is inspected to find and repair flaws such as cracks and holes, to prepare for subsequent lacquering and improve the appearance quality of the wooden wine glass. Low-mesh sandpaper of 240 meshes is used for grinding at this time. Compared with high-mesh sandpaper, the 240-mesh sandpaper has a larger sand particle size, has smaller contact area but high pressure intensity during polishing, and can remove an uneven portion on the surface of the wood at a high speed. This low-mesh grinding step is carried out after the preliminary formation of the wooden wine glass, so as to remove obvious flaws, such as large burrs, rough cutting marks, and small protrusions, maintained on the surface of the wooden wine glass due to previous processing such as the rotary cutting. During the grinding, as the sandpaper continues to rub against the surface of the wooden wine glass, those raised portions on the surface of the wooden wine glass are gradually ground, so that the flatness of the surface of the entire wooden wine glass is significantly improved, which lays a good foundation for fine grinding using higher-mesh sandpaper to enable the wooden wine glass to finally show a fine and smooth texture. In step S60, a layer of natural lacquer is uniformly applied to the surface of the wooden wine glass to preliminarily enhance its waterproof performance and durability and further prepare for the subsequent carbonization step. The carbonization treatment in step S70 is significantly different from the traditional carbonization treatment. Instead of heating and smoldering the wooden wine glass in an anaerobic or low-oxygen environment like the traditional carbonization treatment, a flame gun is used to spray flame to burn the surface of the wine glass in an open environment at a room temperature. The temperature of the sprayed flame is between 500° C. and 1500° C., and a specific temperature the sprayed flame needs to be determined according to different types of wood and different sizes of wooden wine glasses. Because the lacquer has already been applied once before the carbonization treatment, a lacquer layer forms a protective layer on the surface of the wood, and then the carbonization treatment is carried out. Due to the presence of the lacquer layer, a heat and material exchange mode for the wood and the outside world will change during the carbonization. The lacquer layer may slow down the carbonization to an extent and make carbonization more uniform. Moreover, shrinkage, cracking, and other changes of the lacquer layer during the carbonization can highlight the texturing of the wood. When the lacquer layer deforms at a high temperature, small cracks may be produced along a texturing direction of the wood. These cracks are like natural texturing lines, making the texturing of the wood more three-dimensional and vivid. Moreover, this texturing change is random and non-replicable, so that each painted carbonized wooden wine glass has a unique appearance, which increases its artistic value. Meanwhile, the lacquer layer can control the depth and speed of carbonization. For some wooden wine glasses that people desire to keep the original properties or appearance of the wood, the carbonization carried out after the lacquering can be milder through the isolation action of the lacquer layer, to prevent the wood from being excessively carbonized. The secondary grinding in step S80 can effectively remove surface defects caused by the carbonization, to restore the flatness of the surface of the wooden wine glass, and provide a good foundation for the subsequent secondary lacquering. The secondary lacquering not only plays a role in protection and beautification, but also improves the overall performance of the wooden wine glass. The lacquer layer can adjust the thermal conductivity of the wooden wine glass, so that the wooden wine glass can better maintain the temperature when holding hot or cold drink, and can further reduce the impact of heat on a hand of a user. Moreover, the high-quality lacquer layer further has an antibacterial property, which helps to keep the interior of the wooden wine glass clean and provides a user with a healthier drinking experience. The secondary grinding creates a good foundation condition for the secondary lacquering. The secondary lacquering can consolidate and enhance the effect of the secondary grinding. The ground surface of the wooden wine glass is more conducive to adhesion and uniform distribution of the lacquer layer, so that the lacquer layer can better play its protective and decorative role. In turn, the lacquer layer fills tiny pores produced after the grinding, which further improves the smoothness and integrity of the surface of the wooden wine glass. The two processes work together to improve the quality of the wooden wine glass. Moreover, through the carefully designed secondary grinding and secondary lacquering processes, the wooden wine glass with unique characteristics can be made. For example, different grinding modes are used in conjunction with a paint, the wooden wine glass can present different texturing effects, glossiness, and textures, thus meeting aesthetic needs and personalized customization requirements of different consumers. This synergistic effect makes the wooden wine glass more competitive on the market and become a product with unique charm. In the wooden wine glass making procedure after the carbonization is completed, sandpaper of 400 to 600 meshes is used for grinding in the secondary grinding procedure. Compared with sandpaper of 240 meshes, the sandpaper of 400 to 600 meshes has finer sand particles, which can further grind surfaces and make ground inner and outer surfaces of the wooden wine glass smooth and textured. Natural lacquer should be used for the secondary lacquering. The inner and outer surfaces of the wooden wine glass need to be fully uniformly coated with the natural lacquer, and it ensures that there is no black carbide powder on the carbonized portion inside. Natural lacquer is used to ensure safety and hygiene. In step S90, sealing and shade drying is a delicate process that requires a humidifier and a heater, and the environment needs to be controlled within a temperature and humidity range. This operation is usually carried out in a dedicated shade drying room. The most suitable conditions are to maintain an overall temperature at 14 to 30 degrees centigrade and maintain the humidity at 70 to 88 degrees. Under these conditions, the shade drying speed is high and the effect is good. This process involves four key conditions: Firstly, at an appropriate temperature, the activities of urushiol and laccase may be enhanced, and water molecules can further achieve an effect, to jointly promote the drying. Secondly, the moisture is essential as lack of humidity can lead to a decrease in the activities of the urushiol and the laccase. At an excessively low temperature, the urushiol and the laccase may loose their activities. Further, at a temperature only, without a suitable humidity, the drying process cannot be carried out or is carried out very slowly. Finally, at a high humidity, a lacquered surface will experience fogging, lose its luster, and be prone to wrinkling.

In this embodiment, step S20 includes:

S21: selecting a tool;

S22: determining a cutting plan;

S23: performing a cutting operation; and

S24: performing cleaning and inspection.

Through the above steps, a suitable cutting machine is a foundation for ensuring smooth cutting work during execution. A reasonable cutting plan is the key to achieve efficient production and ensure the quality of the product. A precise cutting operation is a foundation for ensuring the size and shape accuracy of the wooden wine glass. Clearing and inspection can avoid bringing faulty wood blocks into subsequent procedures to the largest extent, thereby improving the overall production efficiency and the quality of the product.

In this embodiment, step S23 includes:

S23*a*: fixing the wood; and

S23*b*: performing cutting.

By the above steps, during execution, the wood is firmly fixed during execution is a foundation for the safe and precise cutting operation, and the cutting quality directly affects various procedures of the subsequent wooden wine glass manufacturing. High-quality cutting can reduce the workload of subsequent grinding, finishing, and other procedures, and improve the production efficiency.

In this embodiment, step S24 includes:

S24*a*: cleaning wood dust; and

S24*b*: inspecting the cut block.

By the above steps, during execution, wood dust on the surface of the wood block can be gently brushed off with a soft bristled brush, which can effectively remove the wood dust, without causing damage to the surface of the wood block. A vacuum cleaner can be used to collect the wood dust scattered on and around a workbench. This mode is efficient and can ensure thorough cleaning and keep the working environment clean. It is inspected whether the surface of the wood block has a crack, a burr, a hole, or other defects. If the surface of the wood block has the crack, the crack may further expand during subsequent processing, which reduces the strength and durability of the wooden wine glass. The presence of the burr not only affects the handfeel, but also causes a trouble in the subsequent procedures. The hole may cause leakage and other issues during use of the wooden wine glass. Through strict surface quality inspection, unqualified wood blocks can be promptly screened out to avoid a waste of time and resources in the subsequent processing.

In this embodiment, step S30 includes:

S31: selecting an air drying site;

S32: repairing an air drying tool and an auxiliary material;

S33: placing the wood block;

S34: performing monitoring and adjustment during air drying; and

S35: determining whether the air drying is completed.

By the above steps, during execution, an enough space is needed to site the wood, to ensure a gap between the wood, which is conducive to air circulation and all-round drying of the wood, rather than only partial drying. This is crucial for subsequent uniform drying of the wood and preventing deformation caused by non-uniform drying. During the drying, a hygrometer is used to monitor the humidity of the site in real time, and a corresponding control measure is taken.

In this embodiment, step S34 includes:

S34*a*: regularly inspecting a state of the wood block; and

S34*b*: controlling an air drying environment.

By the above steps, during execution, if the humidity is high, the humidity can be reduced by turning on ventilation equipment or in another way. The state of the wood is regularly inspected during the drying to observe for any signs of color change or mildews. If a local mildew is found, the mildew needs to be cleaned, and the position of the wood block is adjusted in a timely manner to improve a ventilation condition. It is inspected whether the wood has a mud crack. If there is a trend of mud crack, the humidity of the site is appropriately adjusted or the placement mode of the wood is changed.

In this embodiment, step S40 includes:

S41: preparing a tool and a material;

S42: determining a molding plan;

S43: performing a molding operation; and

S44: performing quality check and adjustment.

By the above steps, during execution, step S41 lays a foundation for the molding of the wooden wine glass and determines the quality and efficiency of the subsequent operations. Step S42 determines the best way to transform the design into a solid entity by considering the advantages and disadvantages of different molding processes in conjunction with a wooden wine glass design requirement and style and the characteristics of the wood. Step S43 requires an operator to strictly follow the molding plan and accurately control the steps of molding, to ensure the continuity of the workflow. Step S44 involves comprehensive inspection of the size, appearance, and structure of the wooden wine glass and prompt addressing of any issues that arise, to ensure that the finished wooden wine glass product meets a high-quality standard.

In this embodiment, step S41 includes:

S41*a*: selecting a molding tool; and

S41*b*: preparing an auxiliary material.

By the above steps, during execution, step S41*a* provides a good guarantee for smooth subsequent operations and control of the molding quality by accurately selecting a tool that is suitable for the wooden wine glass molding process, such as a lathe. In step S41*b*, auxiliary materials are carefully prepared, which are crucial for improving the overall quality and structural stability of the wooden wine glass.

In this embodiment, step S42 includes:

S42*a*: analyzing a product; and

S42*b*: planning a process.

By the above steps, during execution, in step S42*a*, the design requirements, target users, usage scenarios, and the like of the wooden wine glass are deeply analyzed, to make its key elements such as shape, size, and style clear and provide a basis for subsequent process selection. In step S42*b*, based on a product analysis result, by considering the advantages and disadvantages of various molding processes such as turning, rotary cutting, and carving, in conjunction with the characteristics of the wood, the most suitable technological plan for making the wooden wine glass is made.

In this embodiment, step S43 includes:

S43*a*: fixing the wood block;

S43*b*: performing cylindrical turning; and

S43*c*: processing an inner hole.

By the above steps, during execution, in step S43, the wood block is first firmly fixed through S43*a* to provide a stable foundation for the subsequent processing. Then, in S43*b*, cylindrical turning is performed to shape an outer contour of the wooden wine glass. Finally, in S43*c*, inner hole processing is carried out to accurately make an internal space of the wooden wine glass that meets the design requirements. The three steps are closely connected to complete the molding operation of the wooden wine glass.

In this embodiment, step S50 includes:

S51: preparing a tool and a material;

S52: performing a grinding operation;

S53: performing repair treatment; and

S54: performing inspection and cleaning.

By the above steps, during execution, in step S50, the sandpaper of 240 meshes, a filling material, and other tools and materials are first prepared through S51. Then, in S52, the grinding operation is performed to smooth the surface of the wooden wine glass. In S53, defects found after the grinding are then repaired. Finally, in S54, the overall quality of the wooden wine glass is inspected, and the surface is cleared, to ensure that the wooden wine glass meets a high-quality standard.

In this embodiment, step S52 includes:

S52*a*: performing large-area rough grinding; and

By the above steps, during execution, in step S52, a piece of large sandpaper of 240 meshes is first used to perform large-area rough grinding on the wooden wine glass through S52*a*, to quickly remove obvious defects and rough portions from the surface. Then, through S52*b*, a piece of small sandpaper of 240 meshes is used to finely grind detailed portions such as edges and corners of the wooden wine glass, to improve the overall smoothness and texture of the wooden wine glass.

In this embodiment, step S53 includes:

S53*a*: repairing cracks; and

S53*b*: repairing pits and worm-eaten holes.

By the above steps, during execution, in step S53, for different defects on the wooden wine glass, suitable materials and processes are used to achieve targeted repair on cracks through S53*a*. Meanwhile, S53*b* is used to fill and repair pits and worm-eaten holes, to ensure the structural integrity and appearance quality of the wooden wine glass.

In this embodiment, step S60 includes:

S61: preparing a lacquer and a tool;

S62: preparing a lacquering environment;

S63: performing pre-lacquering treatment; and

S64: performing a lacquering operation.

By the above steps, during execution, in step S61, the natural lacquer that is suitable for the material and expected effect of the wooden wine glass is selected; the tool such as a spray gun or a brush is prepared, to provide a material basis for the subsequent lacquering operation. In step S62, a clean and dust-free lacquering space with a suitable temperature and humidity is created, to ensure uniform adhesion and good drying of the lacquer, and avoid lacquered surface defects. In step S63, impurities and rough portions are removed from the surface of the wooden wine glass through grinding and cleaning to enhance the adhesion of the lacquered surface and ensure the lacquering effect. In step S64, based on the characteristics of the lacquer and the design of the wooden wine glass, the lacquer layer can be uniformly coated using brushing, spraying, and another way, to shape the appearance of the wooden wine glass and achieve the protective performance of the wooden wine glass.

In this embodiment, step S70 includes:

S71: preparing carbonization equipment and a carbonization site;

S72: performing a carbonization operation; and

S73: performing cooling.

By the above steps, in step S71, a carbonization spray gun that can accurately control a temperature and maintain stable performance, and a well ventilated and safe site without potential safety hazard is planned, to lay a solid foundation for the carbonization operation. In step S72, according to the given process parameters, the carbonization spray gun is used to change the internal structure of the surface layer of the wooden wine glass to obtain the desired characteristics. In step S73, after the carbonization is completed, the wooden wine glass is slowly cooled in a controlled environment.

In this embodiment, step S80 includes:

S81: preparing a lacquer and a tool;

S82: performing inspection before secondary grinding;

S83: performing a secondary grinding operation;

S84: making a preparation before secondary lacquering; and

S85: performing a secondary lacquering operation.

By the above steps, during execution, in step S81, the natural lacquer that is suitable for the material and style of the wooden wine glass, and various lacquering and auxiliary tools are prepared to provide a material support for the secondary lacquering operation. In step S82, the condition of the wooden wine glass is carefully inspected after the preliminary procedures, to clarify portions to be ground and a grinding degree, which provides an accurate guidance for the secondary grinding. In step S83, according to an inspection result, an appropriate tool and measure are used to ground the wooden wine glass, to further improve the surface flatness and smoothness and enhance the adhesion of the lacquer. In step S84, cleaning, dust removal, and the like are performed on the ground wooden wine glass, to create a suitable lacquering environment and provide a good condition for the secondary lacquering. In step S85, an appropriate lacquering technology is used to uniformly and meticulously cover the surface of the wooden wine glass with the natural lacquer, to enhance beautify the appearance of the wooden wine glass and improve the protective performance of the wooden wine glass.

In this embodiment, step S90 includes:

S91: preparing a shade drying site and a container;

S92: making a preparation before the wooden wine glass is put into a box;

S93: performing wooden wine glass placement and sealing operation

S94: monitoring the shade drying process; and

S95: determining whether the shade drying is completed, and performing subsequent treatment.

By the above steps, during execution, in S91, a well ventilated shade drying site with an appropriate humidity is selected, and a container with good sealing performance and a suitable material is prepared to provide an ideal environment for the shade drying of the wooden wine glass. In step S92, final cleaning and inspection are performed on the wooden wine glass to ensure that its surface is free of impurities and damage, and is fully prepared for entering the shade drying container. In step S93, the wooden wine glass is properly placed in the container to avoid squeezing, and then a strict sealing operation is performed to ensure a stable shade drying environment. In step S94, during the shade drying, the environmental parameters such as temperatures and humidities in the site and the container to ensure that the parameters are always in suitable ranges for shade drying of the wooden wine glass. In step S95, it is determined, according to a given standard, whether the shade drying of the wooden wine glass is completed, and the shade-dried wooden wine glass is packaged for further subsequent processing.

The present invention further discloses a carbonized wooden wine glass. The carbonized wooden wine glass is manufactured according to the following manufacturing method of the carbonized wooden wine glass:

S10: selecting a wood;

S20: cutting the wood into a wood block;

S30: drying the cut wood block in the air;

S40: molding the dried wood block to make the wood block into a wooden wine glass;

S50: preliminarily grinding and repairing the molded wooden wine glass;

S60: performing primary lacquering on the preliminarily ground and repaired wooden wine glass;

S70: carbonizing the wooden wine glass subjected to the primary lacquering;

S80: performing secondary grinding and secondary lacquering on the carbonized wooden wine glass; and

S90: performing sealing and shade drying on the wooden wine glass subjected to the secondary grinding and the secondary lacquering.

By the arrangement of the above structure and the above steps, during use, the moisture resistance and corrosion resistance of wood are greatly improved through the carbonization, which effectively solves the problem that the traditional wooden wine glass is prone to moisture and prolongs the service life of a wine glass. Meanwhile, the carbonization process changes an internal structure of the wood, so that the wine glass has an antibacterial property, thereby reducing the possibility of bacterial growth and making the wine glass more hygienic and beneficial to the health of a user. Moreover, the unique carbonized wood keeps the natural texturing and color of the wood, and presents a unique texture after the carbonization treatment, so that the wine glass is beautiful and practical.

The invention claimed is:

1. A manufacturing method of a carbonized wooden wine glass, comprising:

S10: selecting a wood;

S20: cutting the wood into a wood block;

S30: drying the cut wood block in the air;

S40: molding the dried wood block to make the wood block into a wooden wine glass;

S50: preliminarily grinding and repairing the molded wooden wine glass;

S60: performing primary lacquering on the preliminarily ground and repaired wooden wine glass;

S70: carbonizing the wooden wine glass subjected to the primary lacquering;

S80: performing secondary grinding and secondary lacquering on the carbonized wooden wine glass; and

S90: performing sealing and shade drying on the wooden wine glass subjected to the secondary grinding and the secondary lacquering.

2. The manufacturing method of the carbonized wooden wine glass according to claim 1, wherein step S20 comprises:

S21: selecting a tool;

S22: determining a cutting plan;

S23: performing a cutting operation; and

S24: performing cleaning and inspection.

3. The manufacturing method of the carbonized wooden wine glass according to claim 2, wherein step S23 comprises:

S23*a*: fixing the wood; and

S23*b*: performing cutting.

4. The manufacturing method of the carbonized wooden wine glass according to claim 2, wherein step S24 comprises:

S24*a*: cleaning wood dust; and

S24*b*: inspecting the cut block.

5. The manufacturing method of the carbonized wooden wine glass according to claim 1, wherein step S30 comprises:

S31: selecting an air drying site;

S32: repairing an air drying tool and an auxiliary material;

S33: placing the wood block;

S34: performing monitoring and adjustment during air drying; and

S35: determining whether the air drying is completed.

6. The manufacturing method of the carbonized wooden wine glass according to claim 5, wherein step S34 comprises:

S34*a*: regularly inspecting a state of the wood block; and

S34*b*: controlling an air drying environment.

7. The manufacturing method of the carbonized wooden wine glass according to claim 1, wherein step S40 comprises:

S41: preparing a tool and a material;

S42: determining a molding plan;

S43: performing a molding operation; and

S44: performing quality check and adjustment.

8. The manufacturing method of the carbonized wooden wine glass according to claim 5, wherein step S41 comprises:

S41*a*: selecting a molding tool; and

S41*b*: preparing an auxiliary material.

9. The manufacturing method of the carbonized wooden wine glass according to claim 5, wherein step S42 comprises:

S42*a*: analyzing a product; and

S42*b*: planning a process.

10. The manufacturing method of the carbonized wooden wine glass according to claim 5, wherein step S43 comprises:

S43*a*: fixing the wood block;

S43*b*: performing cylindrical turning; and

S43*c*: processing an inner hole.

11. The manufacturing method of the carbonized wooden wine glass according to claim 1, wherein step S50 comprises:

S51: preparing a tool and a material;

S52: performing a grinding operation;

S53: performing repair treatment; and

S54: performing inspection and cleaning.

12. The manufacturing method of the carbonized wooden wine glass according to claim 11, wherein step S52 comprises:

S52*a*: performing large-area rough grinding; and

S52*b*: performing fine grinding.

13. The manufacturing method of the carbonized wooden wine glass according to claim 11, wherein step S53 comprises:

S53*a*: repairing cracks; and

S53*b*: repairing pits and worm-eaten holes.

14. The manufacturing method of the carbonized wooden wine glass according to claim 1, wherein step S60 comprises:

S61: preparing a lacquer and a tool;

S62: preparing a lacquering environment;

S63: performing pre-lacquering treatment; and

S64: performing a lacquering operation.

15. The manufacturing method of the carbonized wooden wine glass according to claim 1, wherein step S70 comprises:

S71: preparing carbonization equipment and a carbonization site;

S72: performing a carbonization operation; and

S73: performing cooling.

16. The manufacturing method of the carbonized wooden wine glass according to claim 1, wherein step S80 comprises:

S81: preparing a lacquer and a tool;

S82: performing inspection before secondary grinding;

S83: performing a secondary grinding operation;

S84: making a preparation before secondary lacquering; and

S85: performing a secondary lacquering operation.

17. The manufacturing method of the carbonized wooden wine glass according to claim 1, wherein step S90 comprises:

S91: preparing a shade drying site and a container;

S92: making a preparation before the wooden wine glass is put into a box;

S93: performing wooden wine glass placement and sealing operation

S94: monitoring the shade drying process; and

S95: determining whether the shade drying is completed, and performing subsequent treatment.

* * * * *